(12) United States Patent
Jonsson et al.

(10) Patent No.: US 7,453,907 B2
(45) Date of Patent: Nov. 18, 2008

(54) ROBUST HEADER COMPRESSION IN PACKET COMMUNICATIONS

(75) Inventors: Lars-Erik Jonsson, Lulea (SE); Krister Svanbro, Lulea (SE); Mikael Degermark, Lulea (SE)

(73) Assignee: Telefonktiebolaget L M Ericsson (PUBL), Stockholm (SE)

( * ) Notice: Subject to any disclaimer, the term of this patent is extended or adjusted under 35 U.S.C. 154(b) by 909 days.

(21) Appl. No.: 10/833,622

(22) Filed: Apr. 28, 2004

(65) Prior Publication Data

US 2004/0202167 A1 Oct. 14, 2004

Related U.S. Application Data

(63) Continuation of application No. 09/335,558, filed on Jun. 18, 1999, now Pat. No. 6,754,231.

(51) Int. Cl.
*H04J 3/18* (2006.01)
*H04L 12/28* (2006.01)

(52) U.S. Cl. .............. 370/477; 370/235; 370/389; 370/392; 370/475

(58) Field of Classification Search .......... 370/230, 370/235, 392, 474, 477, 466, 352, 389, 393, 370/470, 472, 328, 394, 475; 709/236, 247, 709/228

See application file for complete search history.

(56) References Cited

U.S. PATENT DOCUMENTS

| | | | | |
|---|---|---|---|---|
| 5,850,526 | A * | 12/1998 | Chou | 709/247 |
| 6,032,197 | A * | 2/2000 | Birdwell et al. | 709/247 |
| 6,385,199 | B2 * | 5/2002 | Yoshimura et al. | 370/393 |
| 6,397,259 | B1 * | 5/2002 | Lincke et al. | 709/236 |
| 6,438,123 | B1 * | 8/2002 | Chapman | 370/351 |
| 6,542,504 | B1 * | 4/2003 | Mahler et al. | 370/392 |

* cited by examiner

*Primary Examiner*—Afsar M. Qureshi

(57) ABSTRACT

A technique for compressing header information to produce a compressed header portion of a data packet to be transmitted across a communication channel includes generating a checksum from the header information, and providing the checksum as the compressed header portion.

10 Claims, 6 Drawing Sheets

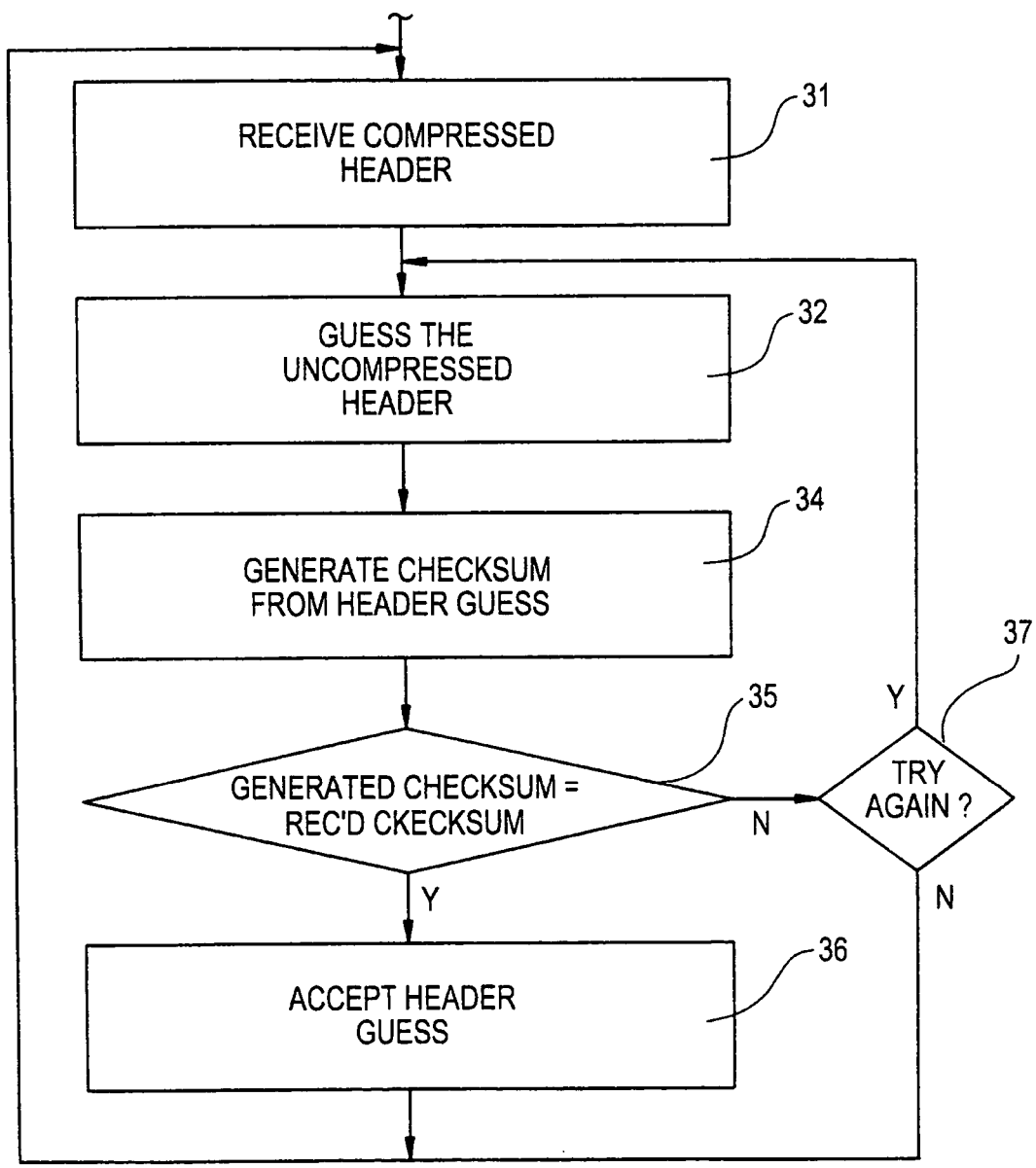

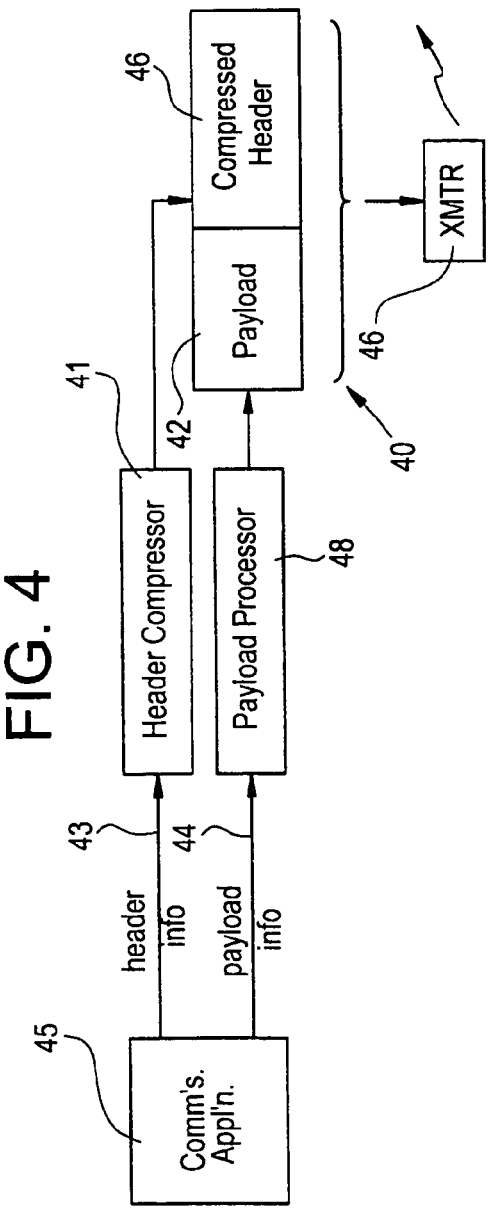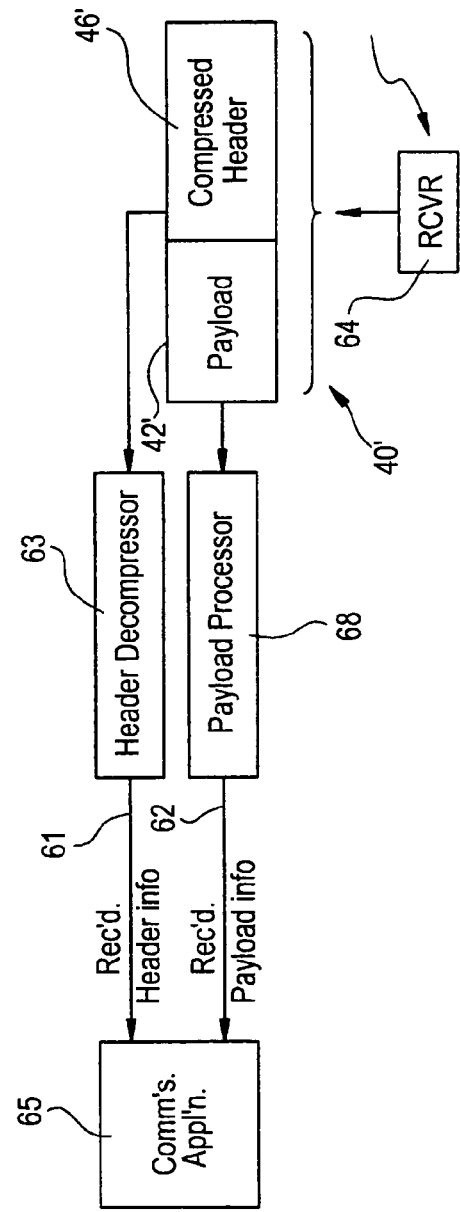

ROBUST HEADER COMPRESSION IN PACKET COMMUNICATIONS

CROSS-REFERENCE TO RELATED APPLICATIONS

This application is a continuation of U.S. patent application Ser. No. 09/335,558 filed on Jun. 18, 1999, the disclosure of which is incorporated herein by reference.

BACKGROUND

The invention relates generally to packet communications and, more particularly, to header compression in packet communications.

SUMMARY

Due to the tremendous success of the Internet, it has become a challenging task to make use of the Internet Protocol IP (see, e.g., Jon Postel, *Internet Protocol*, DARPA RFC 791, September 1981, incorporated herein by reference) over all kind of links. However, because the IP protocols were designed for wired links with high bandwidth capabilities, and because packet headers of the IP protocols are rather large, it is not always a simple task to use IP protocols with narrow band links, for example cellular links. If we consider the scenario when the IP protocols are used for real-time data, for example ordinary speech, the User Datagram Protocol UDP (see, e.g., Jon Postel, *User Datagram Protocol*, DARPA RFC 768, August 1980, incorporated herein by reference) and the Real-Time Transport Protocol RTP (see, e.g, Henning Schulzrinne, Stephen L. Casner, Ron Frederick and Van Jacobson, *RTP: A Transport Protocol for Real-Time Applications*, IETF RFC 1889, IETF Audio/Video Transport Working Group, January 1996, incorporated herein by reference) are applied on top of IP. Together they require a total amount of 40 header octets (IP 20, UDP 8 and RTP 12 octets). If we combine these header requirements with ordinary speech usage, which may have frame sizes as low as 15-20 octets, the header part will disadvantageously represent more than 70% of the packet. With the upcoming new IP version 6 (see, e.g., Steven Deering and Robert Hinden, *Internet Protocol Version 6 (Ipv6) Specification*, RFC 2460, IETF Network Working Group, December 1998, incorporated herein by reference), which has a header of 40 bytes, this problem will increase. Reducing the header sizes would improve the spectrum efficiency and save a lot of money when transmitting over wireless links.

The term header compression (HC) comprises the art of minimizing the necessary bandwidth for information carried in headers on a per-hop basis over point-to-point links. Header compression takes advantage of the fact that some fields in the headers are not changing within a flow, and that most header changes are small and/or predictable. Conventional header compression schemes make use of these facts and send static information only initially, while changing fields are sent either as uncompressed values (e.g., for completely random information) or as differences (or deltas) from packet to packet, the latter typically referred to as difference (or delta) encoding. When difference encoding is used, the compression scheme can be fragile, with its performance very dependent on link quality. For example, if packet loss is common on the link, quality suffers because many consecutive packets are typically lost each time a loss occurs.

Conventional header compression/decompression schemes are often realized using state machines, and the challenging task is to keep the compressor and de-compressor states, (or contexts), consistent with each other.

In general, there are two different conventional techniques to keep the de-compressor context updated. The first technique uses periodic refreshes wherein absolute header data is sent. An advantage of this solution is that its performance is not affected by the round-trip-time (RTT) of the link, due to the fact that no messages are sent from the de-compressor to the compressor. This means that it also works over simplex links. On the other hand, there are a number of disadvantages with periodic refreshing. For example, the average header overhead will be high due to the high number of large refresh headers, most of which are unnecessary. On the other hand, if the header refresh rate is too low, the number of lost packets will be high if errors on the link are common.

The other common way of keeping the context updated is to let the compressor send refreshing information (i.e., absolute header data) only when requested by the de-compressor. This requires a duplex link but reduces the average header overhead because no unnecessary updates are performed. Provided that the RTT is small, this solution also reduces the number of lost packets due to inconsistent context states after a link error. The obvious disadvantages are dependence on the back channel of the duplex link, sensitivity to lost packets on the link, and the high number of consecutive lost packets that will occur in case of an invalid context (and associated refresh request) when the RTT is high.

For all header compression schemes, two measures describe their performance. Compression efficiency describes how much the headers are compressed. This can be expressed by the average or maximal header size, combinations of both, or in other ways. Robustness describes how well the scheme handles loss on the link. Will loss of a packet make the header contexts inconsistent resulting in a large number of subsequent lost packets?

Normally, most conventional header compression schemes perform well, but they require links with low error rates and small RTT's.

Currently, there exist a number of different conventional header compression schemes. In fact, they are not really different schemes but different development states of the same one. The earliest proposals (see, e.g., Van Jacobson, *Compressing TCP/IP Headers for Low-Speed Serial Links*, IETF RDC 1144, IETF Network Working Group, February 1990, incorporated herein by reference) handle only compression of TCP (see, e.g., Jon Postel, *Transmission Control Protocol*, DARPA RFC 761, January 1980, incorporated herein by reference) flows, while ideas have later evolved to make compression of UDP and also RTP headers possible (see, e.g., Mikael Degermark, Björn Nordgren and Stephen Pink, *IP Header Compression*, IETF RFC 2507, IETF Network Working Group, February 1999, incorporated herein by reference; and Steven Casner and Van Jacobson, *Compressing IP/UDP/RTP Headers for Low-Speed Serial Links*, IETF RFC 2508, IETF Network Working Group, February 1999, incorporated herein by reference). Today it could therefore be stated that for real-time data flows there is just one scheme for header compression (see Casner and Jacobson above), which is currently being standardized within the IETF (Internet Engineering Task Force) by the Audio/Video-Transport working group, and which is referred to herein as CRTP.

CRTP compresses the 40 octets of RTP/UDP/IP headers down to 2 octets for most packets and, as long as the links are reliable, this minimal size will almost be equal to the average. CRTP uses difference encoding for three fields: the RTP sequence number field; the RTP time stamp field; and the ID field of the IP header. CRTP uses update requests, as described above, to bring invalidated de-compressor contexts up to date.

A more general scheme for compression of UDP/IP headers (see Degermark, et al. above), which uses the periodic refreshing principle, may also be used, but the RTP headers are then sent uncompressed, resulting in 12 extra header octets in each packet.

CRTP performs well as long as the used link has a low bit-error rate and/or the RTT is small. However, this is often not the case for wireless links. The RTT is generally also of a magnitude that results in a large number of consecutive lost packets before the de-compressor receives a context update. This is in general undesirable for applications such as real-time audio and video. The overall packet-loss-rate will therefore also be too high and it is not considered possible to improve the wireless link characteristics to make the result better. Both reduction of the bit-error rate (BER) and the RTT would be too expensive. Thus, the robustness of CRTP is identified to be its weakness.

One thing that all existing header compression schemes have in common is that their de-compressors have a small amount of intelligence. Because of the typically high predictability of header fields, especially when the kind of data flow is known, this simplicity can be a significant limitation. Many headers could probably be reconstructed even in times of context inconsistency if the de-compressor could perform some header "guesses". However, these "guesses" have to be verified in some way.

One attempt to make the de-compressor more intelligent was proposed by Degermark, et al. through the Twice mechanism. The idea with Twice is that if one packet has been lost, the delta value of the next packet may be applied twice and, if that delta value is the same as for the lost packet, which it is often very likely to be, the header will be correctly reconstructed. As a result, no packets need be discarded due to inconsistent header contexts.

However, more sophisticated reconstruction methods require a way to verify if the header has been correctly reconstructed. One way, which is suggested for Twice, is to use the transport layer checksum. One problem with that solution is that for UDP, the checksum covers the whole packet including the payload which can be undesirable. For instance, audio codecs may prefer to receive corrupted payloads instead of no data at all.

One proposed solution to the aforementioned problem with the transport layer checksum is the so-called UDP Lite approach, wherein the header can include a partial checksum covering only a desired portion of the packet, such as a portion of the header content. Thus a UDP Lite header includes the checksum, a checksum coverage field indicative of the portion of the header covered by the checksum, and the covered header portion itself.

It is desirable in view of the foregoing to provide header compression/decompression techniques that can handle lost packets on the link without losing the de-compressor context, and can provide better compression efficiency than other known techniques.

The invention provides a base concept for a robust header compression scheme making it possible to avoid context inconsistency even when packets are lost on the link. This reduces the number of lost packets substantially, compared to both of the principles described above.

The invention introduces in the header compressor a checksum that covers the uncompressed header. This checksum can be sent as the compressed header and used for verification of reconstructed header data at the decompressor.

BRIEF DESCRIPTION OF THE SEVERAL VIEWS OF THE DRAWINGS

FIG. 3 illustrates exemplary operations associated with the header decompression technique of FIG. 1.

FIG. 4 illustrates an exemplary packet data transmission station according to the invention.

FIG. 6 illustrates an exemplary packet data receiving station according to the invention.

DETAILED DESCRIPTION

Figure 1:
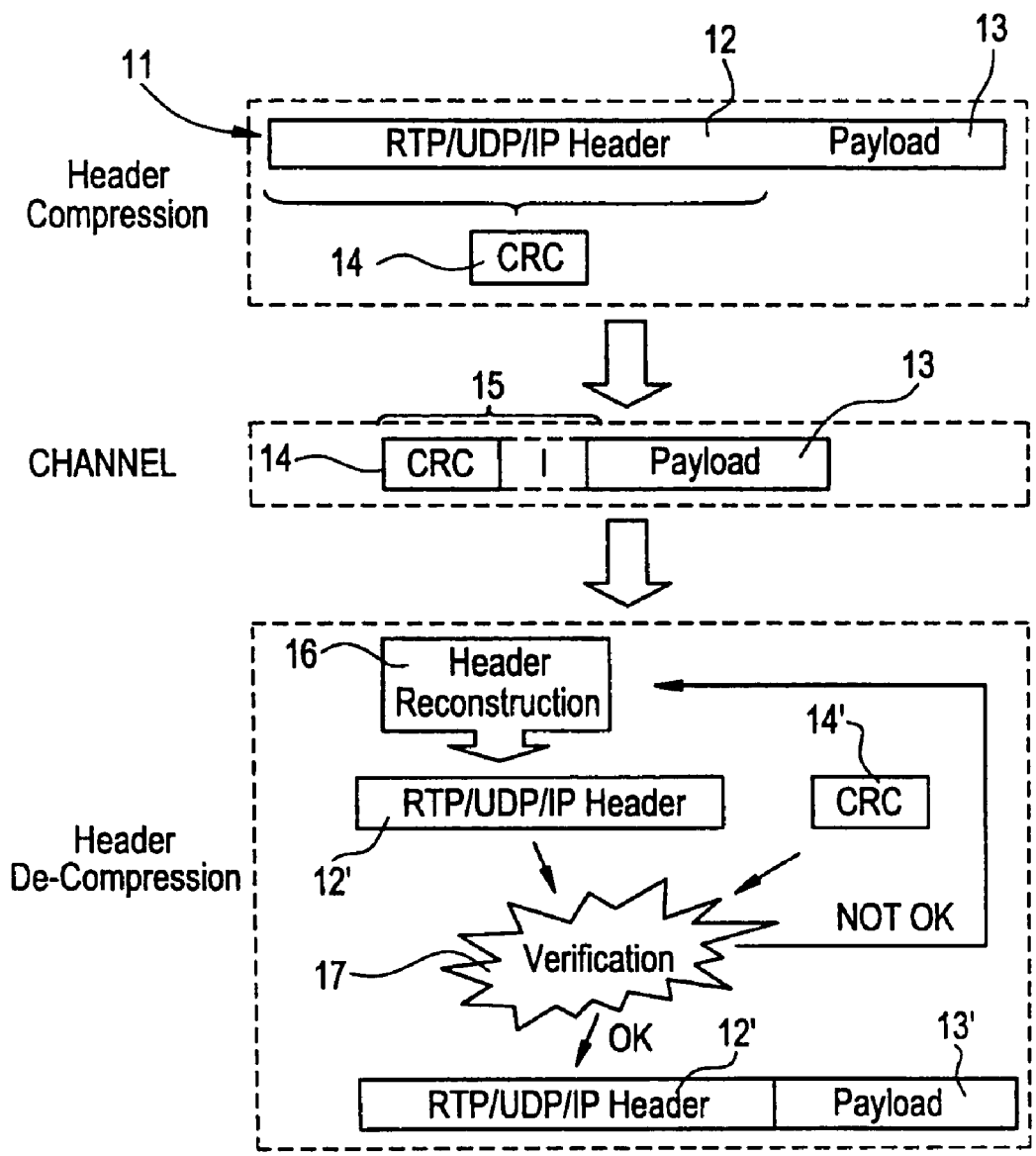
FIG. 1 conceptually illustrates exemplary packet header compression and decompression techniques according to the invention.

FIG. 1 conceptually illustrates exemplary header compression and decompression techniques according to the invention. Header compression is performed in a packet data transmitting station, and header decompression is performed in a packet data receiving station. Referring specifically to the header compression illustrated in FIG. 1, a conventional data packet 11 includes a header portion 12 and a payload portion 13. The header 12 (or any desired field thereof) can be used to generate a checksum 14, for example a conventional Cyclic Redundancy Code (CRC) checksum. The checksum 14 alone can be used as the compressed header (or header field) 15 that is transmitted along with the payload 13 across the communication channel. In one example, the communication channel can include a lossy, narrow bandwidth link, for example a cellular radio link. As shown in broken lines FIG. 1, the compressed header 15 can optionally include other compressed header information I as described below.

The header decompression operation includes a header reconstruction process at 16. The input of the header reconstruction process is the (possibly corrupted) version of the compressed header 15 received from the communication channel. The reconstruction process outputs a reconstructed header 12' which is intended to match the original header 12. The reconstructed header 12' is input to a verification process 17. The verification process 17 attempts to verify the reconstructed header 12 using the received version 14' of the original checksum 14. In one embodiment, the verification process uses the reconstructed header 12' to generate a checksum (a CRC checksum in the FIG. 1 example), and then compares the generated checksum to the received version 14' of the original checksum 14. If the checksum generated in the verification process 17 matches the received checksum 14', then the verification process indicates that the reconstructed header 12' is acceptable (see OK output of verification process 17). If the generated and received checksums do not match, then the verification process 17 outputs a NOT OK indication to the header reconstruction process 16. In response to the NOT OK indication, the header reconstruction process 16 outputs another proposed reconstructed header 12', after which the above-described verification process can be repeated.

The above-described header decompression procedures can be repeated as many times as desired in an attempt to produce a header 12' whose associated checksum matches the received checksum 14'.

Figure 2:
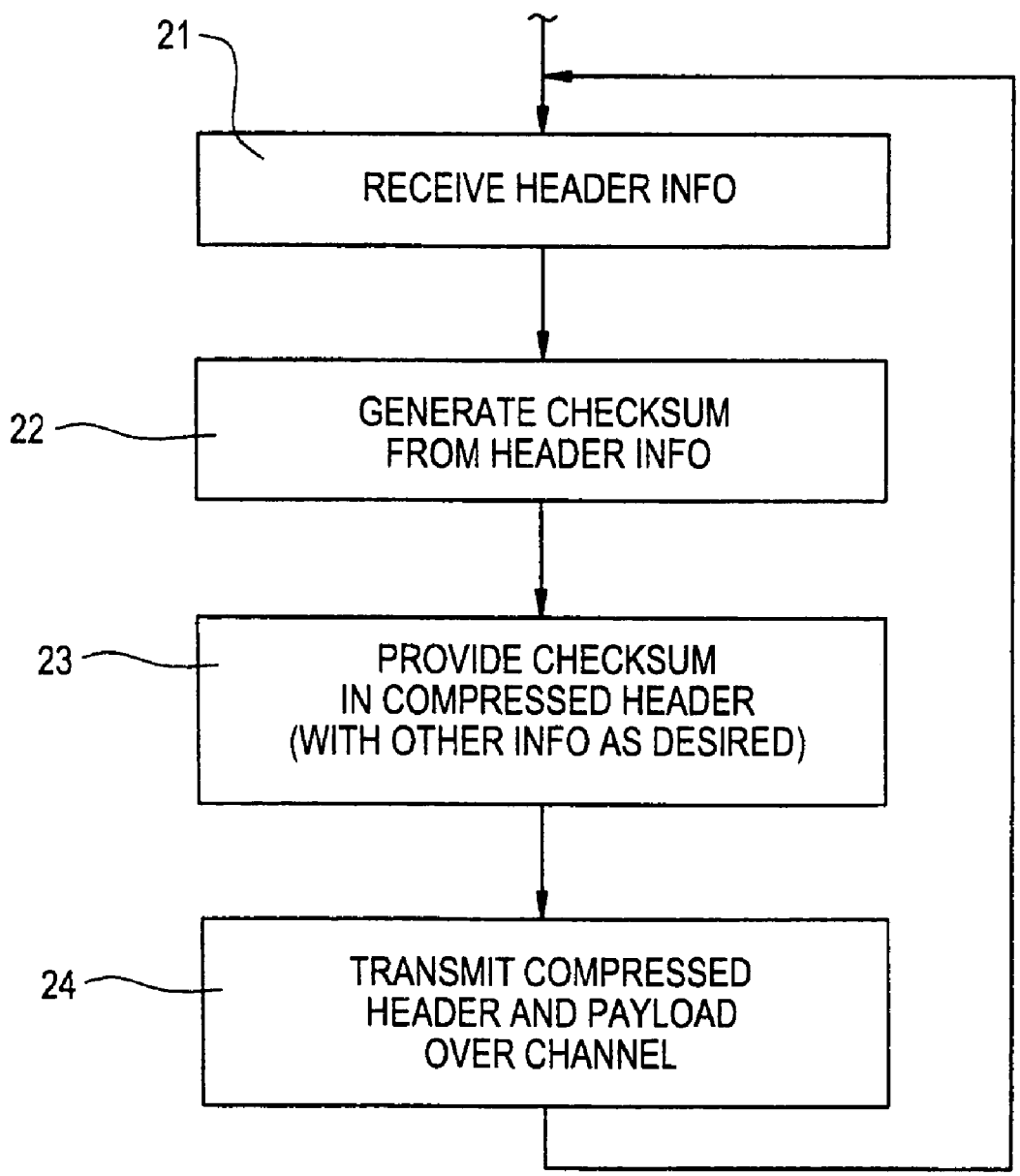
FIG. 2 illustrates exemplary operations associated with the header compression technique of FIG. 1.

FIG. 2 illustrates exemplary operations associated with the above-described header compression techniques according to the invention. After the original (uncompressed) header information is received at 21, a checksum is generated from the header information at 22. Thereafter at 23, the generated checksum is provided in the compressed header (along with other optional compressed header information as desired). At 24, a packet including the compressed header and its associated payload are transmitted over the communication channel.

FIG. 3 illustrates exemplary operations associated with the above-described header decompression techniques according to the invention. At 31, the compressed header is received from the communication channel. At 32, the header reconstruction process attempts to guess the original uncompressed header (see 12 in FIG. 1). In many instances, the difference (delta) between the headers of successive packets is easily predictable by the reconstruction process. For example, during a period of speech in real-time voice communications, the time stamp value can typically be expected to change by approximately the same amount between any given pair of successively received packets. Accordingly, at 32 in FIG. 2, the reconstruction process (see 16 of FIG. 1) can typically make an accurate guess of the time stamp of the current packet based on the time stamp of the previous packet, without receiving in the compressed header of the current packet any information (e.g., I in FIG. 1) about the difference between the respective time stamps of the current packet and the immediately previous packet.

In other situations, however, a given header field is not so easy to predict at 32. Using the aforementioned example of real-time voice communications, after a period of silence or speech inactivity during which predetermined non-speech packets (e.g. SID frame packets in conventional DTX systems) are typically transmitted, the time stamp of the first speech packet received after the period of speech inactivity will have a time stamp value that differs, by a typically large and, more importantly, unpredictable amount, from the time stamp value of the last speech packet received before the period of speech inactivity. In situations such as this, the additional compressed information I of FIG. 1 can be sent in the compressed header along with the checksum in order to assist the reconstruction process 16 in reconstructing the original header.

In the example of real-time voice communications, the information I can be, for example, the least significant bits of the time stamp of the first speech packet after the period of speech inactivity. The reconstruction process 16 can then, for example, note the absolute time difference between the arrival of the last speech packet received before the period of speech inactivity and the arrival of the first speech packet received after the period of speech inactivity. This time difference can be combined with an estimate of how much the time stamp value typically changes per unit time in order to arrive at an estimate of the difference between the time stamps of the aforementioned two packets. The most significant bits of this time stamp difference estimate can then be combined with the least significant bits received in the compressed header to provide at 32 a guess of the uncompressed time stamp value.

At 34, the header guess (e.g. time stamp guess) is used to generate a checksum, and the generated checksum is compared at 35 to the received checksum. If the generated and received checksums match, then the header guess is accepted at 36. If the received and generated checksums do not match at 35, then a desired timeout criterion such as the amount of elapsed time or the number of failed guesses can be considered at 37 in order to determine whether to try another guess at 32 or give up the header reconstruction process.

FIG. 4 illustrates an exemplary embodiment of a packet data transmitting station according to the invention. In the embodiment of FIG. 4, a conventional packet data communications application 45 produces header information at 43 and payload information at 44. The header information 43 is applied to a header compressor 41 which compresses the header information 43 to produce a compressed header 46. The compressed header 46 is combined with a payload 42 to form a packet 40. The payload 42 can be produced in conventional fashion from the payload information 44 by a payload processor 48. The packet 40 is provided to a conventional radio transmitter apparatus 46 which can use well known techniques to transmit the packet across a radio communication link, for example a cellular radio link. The transmitting station of FIG. 4 could be, for example, a fixed-site or mobile transmitting station operating in a cellular communication network.

Figure 5:
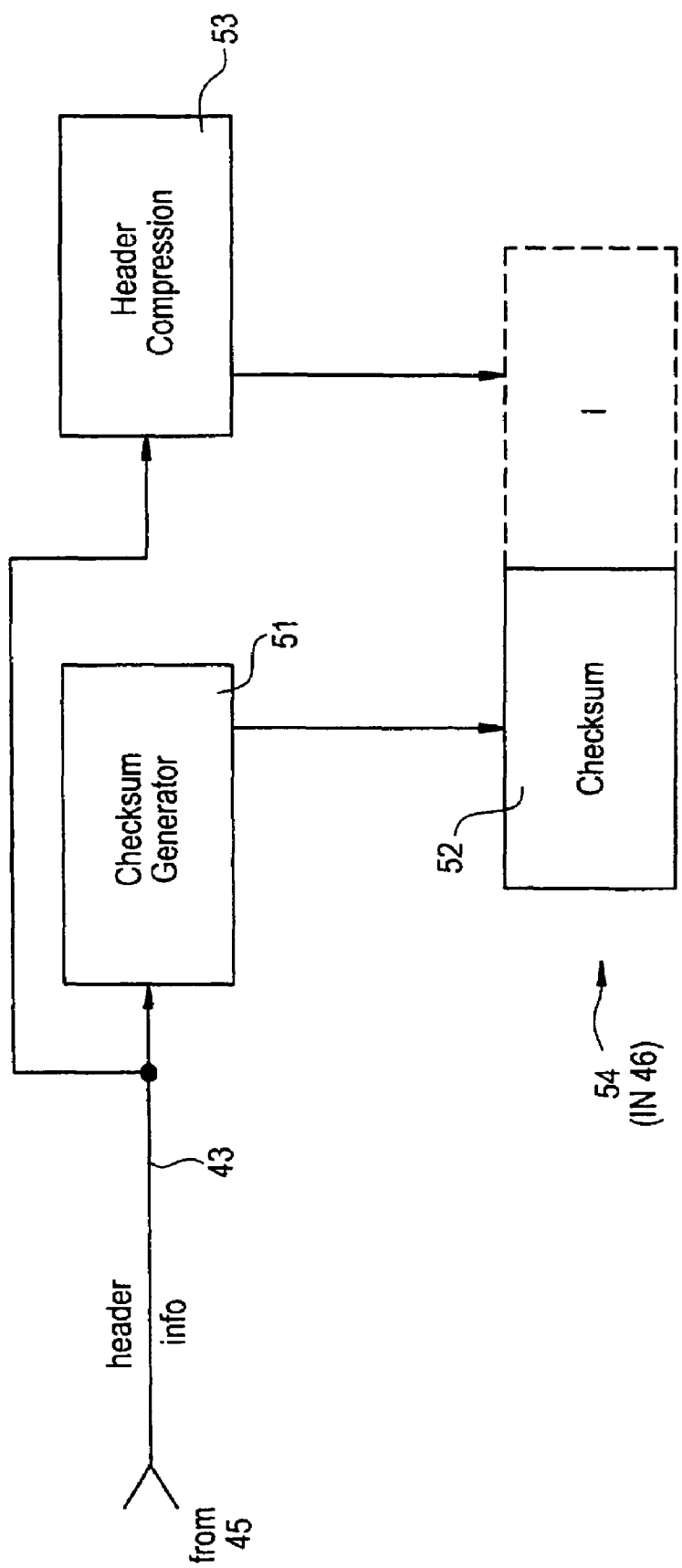
FIG. 5 illustrates an exemplary embodiment of the header compressor of FIG. 4.

FIG. 5 illustrates an exemplary portion of the header compressor 41 of FIG. 4, which can perform the exemplary operations of FIG. 2. Header information received at 43 from the communications application 45 of FIG. 4 is input to a checksum generator 51 which can generate therefrom a checksum 52. The header information is also provided to a header compression unit 53 which can selectively provide additional compressed header information I (see FIG. 1) for use in reconstructing the header information at the decompressor. The checksum 52 and additional information I, which information I is shown in broken line in FIG. 5 to designate that it is optional, are combined to form at least a portion 54 (e.g., a field) of the compressed header 46 of FIG. 4.

The exemplary techniques illustrated in FIGS. 2 and 5 can be used to compress any desired portion (e.g., a field) of, or all portions of, the header information 43.

FIG. 6 illustrates an exemplary embodiment of a packet data receiving station according to the invention. A conventional radio receiver 64 can use well known techniques to receive from a radio link a received version 40' of a transmitted packet such as shown at 40 in FIG. 4. The received packet version 40' includes a received version 46' of the original compressed header 46 and a received version 42' of the original payload 42. The received payload version 42' is provided to a payload processor 68 that can use conventional techniques to provide corresponding received payload information at 62 to a packet data communications application 65. The received compressed header version 46' is applied to a header decompressor 63. The header decompressor 63 decompresses the received compressed header version 46' and provides the communications application 65 with corresponding received header information 61.

Figure 7:
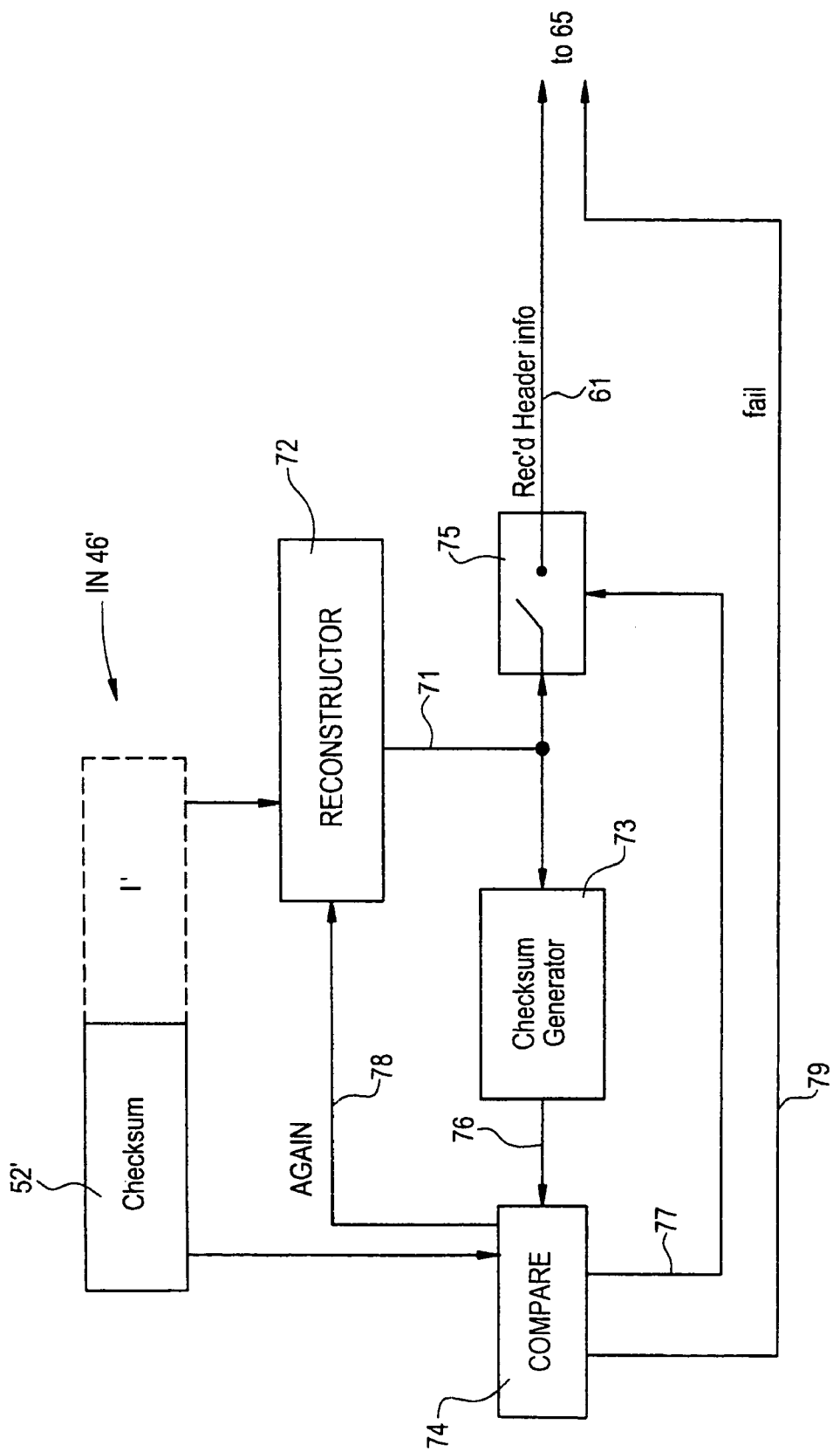
FIG. 7 illustrates an exemplary embodiment of the header decompressor of FIG. 6.

FIG. 7 illustrates an exemplary portion of the header decompressor 63 of FIG. 6, which can perform the exemplary operations of FIG. 3. In the embodiment of FIG. 7, a header reconstructor 72 receives the received version I' of any additional compressed header information I that may have been included in the original compressed header (see, e.g., FIG. 5). The reconstructor produces a header guess at 71, for example in conventional fashion based on typically expected differences between header fields of consecutive packets, or based on the received additional information I'.

The header guess 71 is applied to a checksum generator 73 which produces therefrom a checksum at 76. A comparator 74 then compares the generated checksum 76 to the received version 52' of the original checksum (see, e.g., 52 in FIG. 5). If the generated and received checksums match, then comparator output 77 is activated to operate a connecting unit 75 which provides the header guess 71 to the received header information input 61 of the communications application 65 (see FIG. 6). If the generated and received checksums do not match, then the comparator 74 activates an AGAIN output 78 which instructs the reconstructor 72 to make another guess. Thus, the checksum generator 73 and comparator 74 form a verification apparatus that uses the received checksum version 52' to verify or deny the correctness of the header guess at 71. After a timeout period elapses without a checksum match, or after a predetermined number of failed checksum comparisons, the comparator 74 can output a fail signal 79 to the communications application 65 indicating that the header information cannot be successfully reconstructed.

The exemplary techniques of FIGS. 3 and 7 can be used to decompress any desired portion (e.g., field) of, or all portions of, a compressed header such as shown at 46' in FIG. 6.

It will be apparent to workers in the art that the embodiments described above with respect to FIGS. 1-7 can be readily implemented by suitable modifications in software, hardware or both in header compressors and decompressors of conventional packet data transmitting and receiving stations.

It will also be appreciated by workers in the art that the above-described invention provides a way to verify the correctness of reconstructed header fields. This makes it possible to do more sophisticated "guessing" at the decompressor based on any additional information sent in compressed headers and/or knowledge about the header field changes. The invention also permits use of a simplified link layer which, for example, need not provide error detection. Header compression based on the techniques of the invention has improved robustness as compared to conventional schemes. The invention permits the packet loss rate to be decreased, and also decreases the length of packet loss sequences. Also, the reconstruction techniques of the invention permit the number of soft state updates to be decreased, thus correspondingly decreasing the average header size.

It will also be evident that the above-described invention is applicable to packet communications over any lossy, narrow bandwidth link, including real-time communications applications such as, for example, real-time audio and video applications.

Although exemplary embodiments of the present invention have been described above in detail, this does not limit the scope of the invention, which can be practiced in a variety of embodiments.

What is claimed:

1. A method of compressing header information to produce a compressed header portion of a given data packet to be transmitted across a communication channel, said method comprising the steps of:
   determining that the header information of the given data packet includes only static information or information with predictable differences from the header information of a previous data packet;
   generating a checksum from the header information of the given data packet; and
   transmitting only the checksum as the compressed header portion of the given data packet in response to determining that the header information of the given data packet includes only static information or information with predictable differences from the header information of the previous data packet.

2. The method of claim 1, further comprising the steps of:
   determining that the header information of the given data packet includes information with differences that are not predictable from the header information of the previous data packet;
   deriving from the header information of the given data packet, additional information for use in reconstructing the header information of the given data packet at a receiving end of the communication channel; and
   transmitting the additional information in the compressed header portion of the given data packet together with the checksum in response to determining that the header information of the given data packet includes information with differences that are not predictable from the header information of the previous data packet.

3. The method of claim 1, wherein said generating step includes generating a Cyclic Redundancy Code (CRC) checksum.

4. The method of claim 1, wherein the communication channel includes a wireless communication link.

5. The method of claim 2, wherein the information with differences that are not predictable is a time stamp having a value represented by a plurality of bits, and the step of deriving additional information includes:
   selecting at least one least significant bit from the plurality of bits; and
   transmitting the at least one least significant bit in the compressed header portion of the given data packet together with the checksum.

6. An apparatus for compressing header information to produce a compressed header portion of a given data packet to be transmitted across a communication channel, said apparatus comprising:
   an input for receiving the header information of the given data packet;
   means for determining that the header information of the given data packet includes only static information or information with predictable differences from the header information of a previous data packet;
   a checksum generator coupled to said input for generating a checksum from the header information of the given data packet; and
   an output coupled to said checksum generator for transmitting only the checksum as said compressed header portion of the given data packet.

7. The apparatus of claim 6, further comprising:
   means for determining that the header information of the given data packet includes information with differences that are not predictable from the header information of the previous data packet; and
   a header compressing apparatus coupled to said input for deriving from the header information of the given data packet, additional information for use in reconstructing the header information of the given data packet at a receiving end of the communication channel;
   wherein responsive to a determination that the header information of the given data packet includes information with differences that are not predictable, the output transmits the additional information in the compressed header portion of the given data packet together with the checksum.

8. The apparatus of claim 6, wherein said checksum generator is operable to generate a Cyclic Redundancy Code (CRC) checksum.

9. The apparatus of claim 6, wherein said communication channel includes a wireless communication link.

10. A method of decompressing a compressed header portion of a given data packet received from a communication channel in order to produce header information, wherein the given data packet is received following a period of inactivity after receiving a previous data packet, said method comprising the steps of:

- obtaining from the compressed header portion of the given data packet, a received version of a checksum that was generated from the header information of the given data packet at a transmitting end of the communication channel;
- obtaining from the compressed header portion of the given data packet, at least one least significant bit of a time stamp having a value represented by a plurality of bits;
- determining an absolute time difference between reception of the previous data packet and reception of the given data packet;
- obtaining an estimate of how much the time stamp typically varies per unit of time;
- determining a time stamp difference estimate of a difference between a time stamp of the previous data packet and the time stamp of the given data packet, said time stamp difference estimate being determined from the absolute time difference and the estimate of how much the time stamp typically varies per unit of time, wherein the time stamp difference estimate includes most significant bits and least significant bits;
- combining the most significant bits of the time stamp difference estimate with the at least one least significant bit of the time stamp obtained from the compressed header portion of the given data packet to provide a guess of an uncompressed time stamp value for the given data packet;
- utilizing the guess of the uncompressed time stamp value for the given data packet to generate a checksum; and
- comparing the generated checksum with the received version of the checksum to verify the guess of the uncompressed time stamp value.

* * * * *

UNITED STATES PATENT AND TRADEMARK OFFICE
CERTIFICATE OF CORRECTION

PATENT NO. : 7,453,907 B2  
APPLICATION NO. : 10/833622  
DATED : November 18, 2008  
INVENTOR(S) : Jonsson et al.

Page 1 of 1

It is certified that error appears in the above-identified patent and that said Letters Patent is hereby corrected as shown below:

On the Title Page, item (75), under "Inventors", in Column 1, Line 1, delete "Lulea" and insert -- Luleå --, therefor.

On the Title Page, item (75), under "Inventors", in Column 1, Line 2, delete "Lulea" and insert -- Luleå --, therefor.

On the Title Page, item (75), under "Inventors", in Column 1, Line 3, delete "Lulea" and insert -- Luleå --, therefor.

On the Title Page, item (73), under "Assignee", in Column 1, Line 1, delete "Telefonktiebolaget" and insert -- Telefonaktiebolaget --, therefor.

Signed and Sealed this  
Eighth Day of July, 2014

Michelle K. Lee  
*Deputy Director of the United States Patent and Trademark Office*